S. B. BOWEN.
Horse Hay-Forks.

No. 141,851.  Patented August 19, 1873.

Witnesses.

Inventor,
Samuel B. Bowen
by J. W. Woodruff
Attorney

UNITED STATES PATENT OFFICE.

SAMUEL B. BOWEN, OF STOCKTON, CALIFORNIA.

IMPROVEMENT IN HORSE HAY-FORKS.

Specification forming part of Letters Patent No. 141,851, dated August 19, 1873; application filed June 3, 1873.

*To all whom it may concern:*

Be it known that I, SAMUEL B. BOWEN, of Stockton, in the county of San Joaquin and State of California, have invented certain new and useful Improvements in Horse-Forks for Gathering and Loading Hay, Grain, and other Substances; and the following is a full, clear, and exact description of the same, reference being had to the accompanying drawing making a part of this specification, in which—

Figure 1:
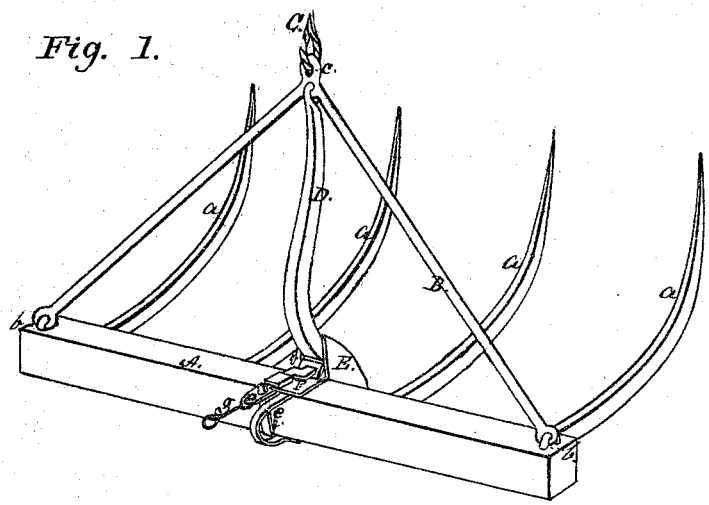
Figure 2:
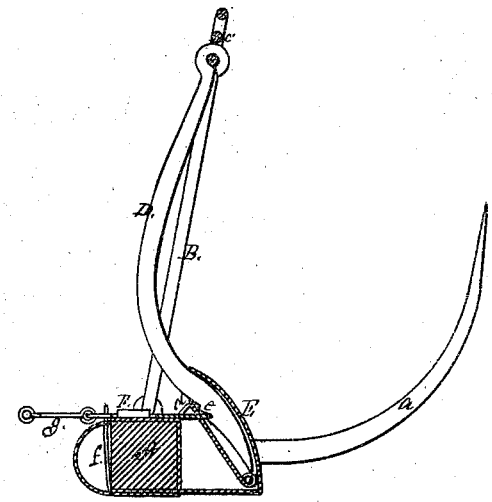
Figure 3:
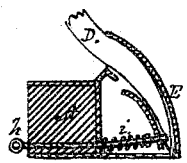

Figure 1 represents a perspective view of my improvement, showing the device for locking and holding the forks in position for lifting the substance and liberating the same. Fig. 2 shows a sectional end-view of the improvement with the locking and liberating mechanism. Fig. 3 is a broken-off sectional view of the same, showing a modified form of the locking and liberating device.

My invention relates to labor-saving agricultural implements for gathering and loading hay, grain, and other substances by horse-power; and it consists in the mechanical device for firmly locking and holding the rake or fork tines in position for gathering and loading, and readily and easily liberating the same for discharging the contents.

To enable others to make and use my improvements, I will describe them more fully, referring to the several figures of the drawings and the letters marked thereon.

The rake or fork head A is made of a square piece of hard wood or timber, of any required size or length. To it are attached or inserted a series of curved tines, $a\ a\ a$, made of tempered steel. To the ends of the head A are secured staples $b\ b$, to which is jointed an angular bail, B, it being provided with an eye, $c$, in the center to attach the cord or rope C for elevating. To the central portion of the bail B, just under the ring or eye $c$, is attached a crooked arm, D, which extends down and enters a socket, E, made of cast malleable iron, to which the locking device is attached. The lower portion of the arm D, that slides into the socket E, is provided with a notch or notches, $e$, into which a spring-dog, $d$, and a sliding bolt or latch, F, catch to hold the head and tines in the proper position for gathering and loading, the sliding bolt or latch F being held by the spring $f$, but is easily withdrawn by the cord or link chain $g$ for liberating and discharging the contents of the rake or fork.

A slight modification of the mode of fastening the arm D is shown in Fig. 3, where, instead of the sliding latch F and spring-dog $d$, a simple sliding bolt, $h$, passes through the head A, having a spiral spring, $i$, incased within the socket E to force and hold the bolt $h$ into a notch, $j$, in and near the inner end of the crooked arm D.

For liberating, the bolt $h$ is withdrawn in the same manner as the latch F.

The above-described implement, properly constructed, answers well, and will perform the twofold purpose of a horse hay or grain rake and a loading-fork, and is a cheap, durable, and almost indispensable article for large grass and grain growing sections.

What I claim as my invention, and desire to secure by Letters Patent, is—

The mechanical device for locking the fork in position for loading and liberating the same, consisting of the arm D, socket E, catch F, spring $f$, and dog $d$, all combined and arranged to operate substantially in the manner as herein shown and described, for the purposes set forth.

In testimony whereof I hereunto subscribe my name.

SAMUEL BENJAMIN BOWEN.

Witnesses:
W. S. MONTGOMERY,
W. E. GREENE.